United States Statutory Invention Registration [19]

[11] Reg. Number: H639

Stern et al. [43] Published: Jun. 6, 1989

[54] METHOD OF MAKING A FERRITE ELEMENT

[75] Inventors: Richard A. Stern, Allenwood; Richard W. Babbitt, Fair Haven, both of N.J.

[73] Assignee: The United States of America as represented by the Secretary of the Army, Washington, D.C.

[21] Appl. No.: 188,934

[22] Filed: May 2, 1988

[51] Int. Cl.[4] ..... B29C 35/02; B29C 67/00

[52] U.S. Cl. ..... 264/80; 264/235

[58] Field of Search ..... 264/80, 81

[56] References Cited

U.S. PATENT DOCUMENTS

| | | | |
|---|---|---|---|
| 3,405,212 | 10/1968 | Fraser et al. | 264/221 |
| 3,467,583 | 9/1969 | Naimer | 264/81 |
| 3,673,293 | 6/1972 | Teague | 264/220 |
| 4,179,795 | 12/1979 | Babbitt | 264/317 |
| 4,643,322 | 2/1987 | Dickson | 425/78 |

*Primary Examiner*—John F. Terapane
*Assistant Examiner*—John M. Covert
*Attorney, Agent, or Firm*—Sheldon Kanars; Roy E. Gordon

[57] ABSTRACT

A ferrite element for millimeter-wave ferrite control devices is made by arc-plasma-spraying ferrite material into a mold type cavity having the configuration of the desired ferrite element.

4 Claims, No Drawings

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

METHOD OF MAKING A FERRITE ELEMENT

The invention described herein may be manufactured, used, and licensed by or for the Government for governmental purposes without the payment to us of any royalty thereon.

This invention relates in general to a method of making ferrite elements and in particular to a method of making ferrite elements for use in millimeter-wave ferrite control devices.

BACKGROUND OF THE INVENTION

The application is copending with U.S. patent application Ser. No. 171,325, filed March 21, 1988, for "Improved Method of Making a Ferrite Circulator" by R. A. Stern and R. W. Babbitt and assigned to a common assignee.

Ser. No. 171,325 described a method of making a ferrite circulator wherein ferrite material is arc plasma sprayed into the cavity area of a microstrip circuit, thus eliminating any chance of gaps between ferrite material and microstrip substrate material.

This still leaves the problem of making low cost ferrite elements in volume numbers for use in radar and communication applications. Heretofore, these ferrite elements have been made by slow molding processes requiring numerous processing steps.

SUMMARY OF THE INVENTION

The general object of this invention is to provide a method of making ferrite elements for use in millimeter-wave ferrite control devices. A more particular object of the invention is to provide such a method of making ferrite elements in volume numbers at lower costs eliminating the slower molding processes that requires additional processing steps.

It has now been found that the aforementioned objects can be attained by arc-plasma-spraying the ferrite materials into a mold type cavity having the configuration of the desired ferrite element or into an array of identical mold type cavities or impressions, each cavity having the configuration of the desired ferrite element.

DESCRIPTION OF THE PREFERRED EMBODIMENT

It is desired to fabricate a Y-shaped ferrite element that has very fine tapered feather edges on the three legs of the Y configuration. A mold is first obtained having the configuration of the desired Y-shaped ferrite element. The surface of the cavity is then coated with a "mold-release" solution so as to allow easy removal of the completed ferrite element. The cavity is then filled with ferrite by arc-plasma-spraying, with minimal surface finishing required after completion of the spray process. The ferrite element is then easily removed from the cavity and is complete in geometrical configuration, just having to be annealed to optimize the ferrite magnetic properties.

Thus, applicants have provided a method of effectively and efficiently making low-cost ferrite elements having unique configurations. The method results in fabrication of ferrite elements in volume numbers resulting in faster, easier, lower cost fabrication of ferrite elements heretofore made by slower molding processes that require additional processing steps.

The configuration of the ferrite element made will generally be one having a low thickness to volume ratio.

The mold that contains the ferrite will generally be made of metal or other conventional molding material that will provide a smooth surface and accurate tolerances. Standard lecithin based solutions can be used as the "mold release" solutions.

By arc-plasma-spraying as the term is used herein, is meant, a process of feeding ferrite powder into an electric arc where it is melted and directed to a target. Such a process is shown in the article "Arc Plasma Fabrication of Ferrite-Dielectric Composites" by R. W. Babbitt, American Ceramic Society Bulletin, June 1976, at page 566–568.

In the arc plasma or flame spray method, any free flowing ferrite powders can be used. The method is generally short duration taking about 2 minutes.

We wish it to be understood that we do not desire to be limited to the exact details as described for obvious modifications will occur to a person skilled in the art.

What is claimed is:

1. Method of making a ferrite element for millimeter-wave ferrite control devices from a mold type cavity having the configuration of the desired ferrite element, said method comprising coating the surface of the cavity with a mold release solution so as to allow easy removal of the completed ferrite element, filling the cavity with ferrite by arc-plasma-spraying, removing the ferrite element from the cavity and annealing the ferrite element to optimize the ferrite magnetic properties.

2. Method according to claim 1 wherein the ferrite element is a Y-shaped ferrite element having very fine tapered feather edges on the three legs of the Y configuration.

3. Method of making ferrite elements for millimeter-wave ferrite control devices from an array of identical mold type cavities, each cavity having the configuration of the desired ferrite element said method comprising coating the surface of the respective cavities with a mold release solution so as to allow easy removal of the completed ferrite elements, filling the cavities with ferrite by arc-plasma-spraying, removing the ferrite elements from the cavities and annealing the ferrite elements to optimize the ferrite magnetic properties.

4. Method according to claim 3 wherein the ferrite element is a Y-shaped ferrite element having very fine tapered edges on the three legs of the Y configuration.

* * * * *